March 21, 1961  S. W. ARENSON  2,976,153
PROCESS FOR PREPARING POTATO CHIPS
Filed Feb. 5, 1958  2 Sheets-Sheet 1
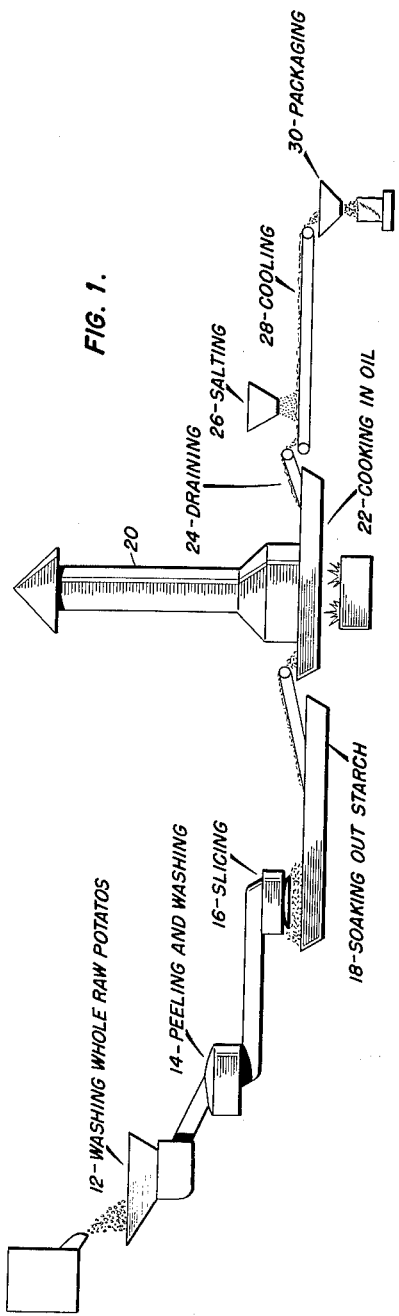
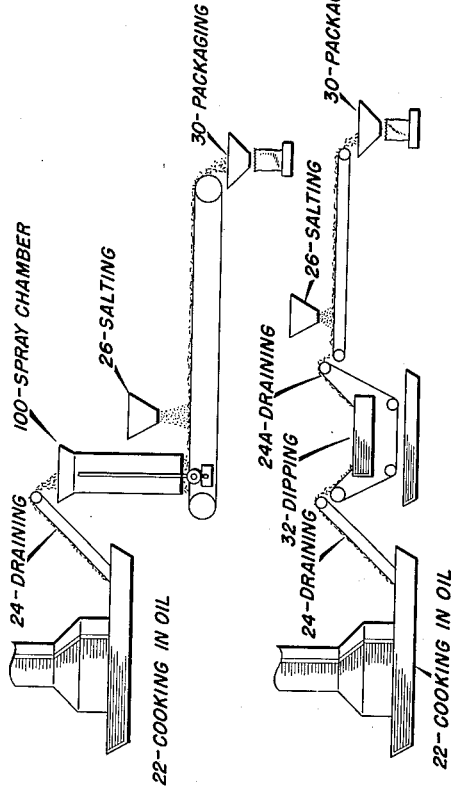
INVENTOR.
SIMON W. ARENSON
BY
Walter G. Finch
ATTORNEY March 21, 1961  S. W. ARENSON  2,976,153
PROCESS FOR PREPARING POTATO CHIPS
Filed Feb. 5, 1958  2 Sheets-Sheet 2
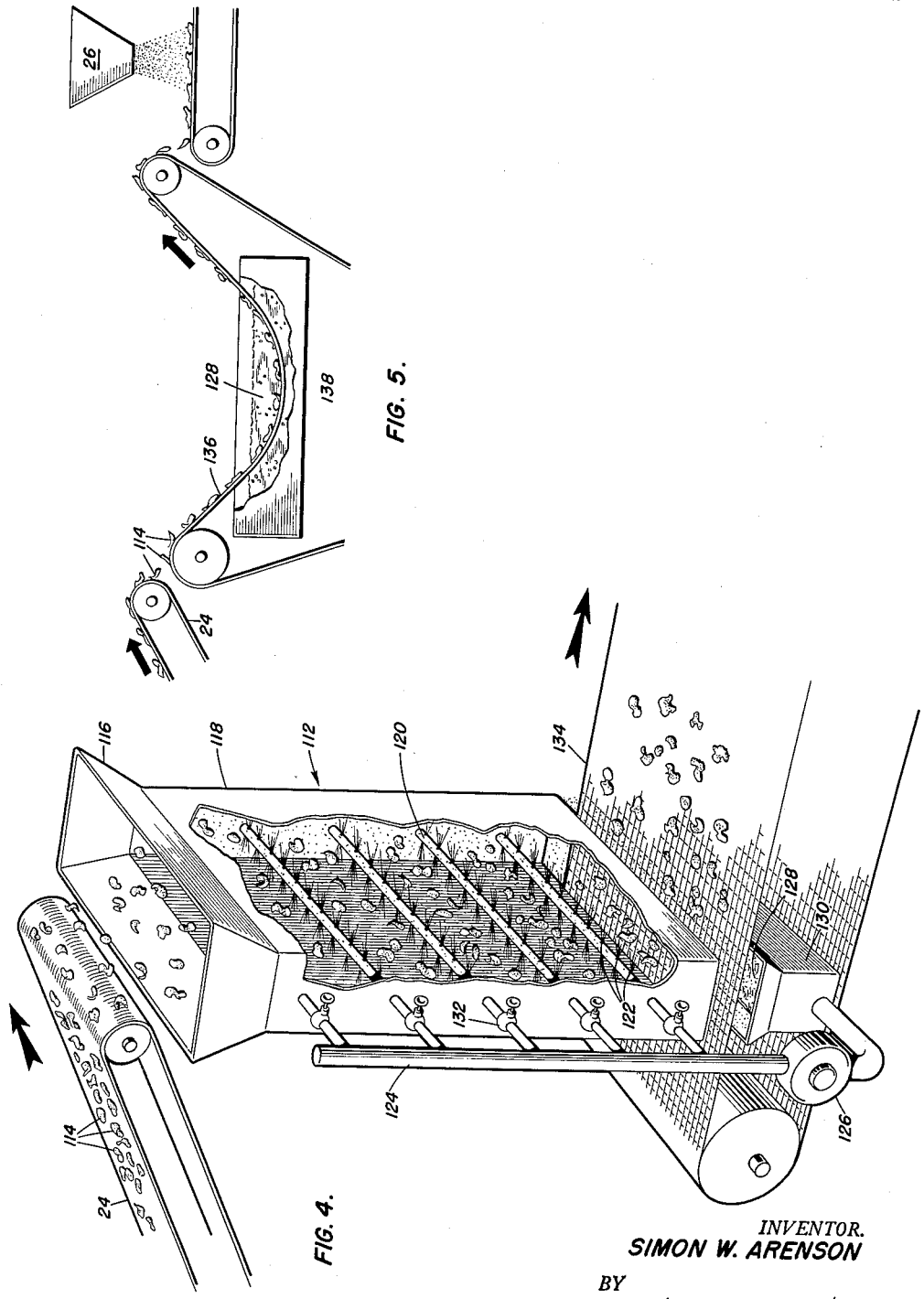
INVENTOR.
SIMON W. ARENSON
BY
Walter G. Finch
ATTORNEY

United States Patent Office 2,976,153
Patented Mar. 21, 1961

2,976,153
PROCESS FOR PREPARING POTATO CHIPS

Simon W. Arenson, 3406 Bancroft Road, Baltimore, Md., assignor of twenty-four and one-half percent to Alvin N. Geser, Baltimore, and twenty-four and one-half percent to Alvin C. Schugam, Owings Mill, Md.

Filed Feb. 5, 1958, Ser. No. 713,386

4 Claims. (Cl. 99—100)

This invention relates generally to food products, and more particularly it relates to potato chip products and to a new method and apparatus for manufacturing such products.

Potato chips are conventionally manufactured in a continuous process in which, first, whole potatoes are washed and scrubbed clean. The potatoes are next passed into a buffer type peeler where their skins are removed and are given a further washing. The peeled potatoes are then sliced by a rotary slicer. The slices of potatoes are then drenched with running water to remove the free starch and are then conveyed to the cooker. A deep, hot fat process is used and the chips are thrust beneath the cooking oil and carried down the length of the vat by reciprocating rakes. The vegetable moisture passes up a stack in the form of steam, while the cooked potatoes are drained as they emerge on a conveyor. As the cooked potatoes pass to a cooling line, they are salted and then packaged.

The highest grades of oil are used in the cooking of the potatoes because the oil which is left on the chips when they are packaged governs, to a large degree, the taste and keeping qualities of the product. The draining of cooking oil from the chips must be accurately controlled because in prior processes the cooking oil, having been heated, has become altered in composition. This modified oil is prone to become rancid in a short time. On the other hand, a completely dry potato chip is flavorless.

In preparing the potato chips mentioned above, the properly chosen potatoes are held under conditions calculated to reduce the total sugar content, thus preventing excessive darkening of the finished chip product.

After mechanical removal of the skin and eyes of the potato, chips averaging .05 in. in thickness are cut and then washed to remove suspended starch and soluble sugars. The potato chips are then ready for processing.

Both batch and continuous frying processes are in use in cooking the potato chips. In batch operations, the potato chips are submerged in deep kettles of fat held at temperatures of 325 to 435° F. In continuous processes, finger-like claws move the chips forward through shallow trays containing the frying medium. Liquid vegetable fats are used because potato chips fried in them have a soft texture and are prized in the major areas of the United States.

After frying, the potato chips are allowed to drain, are salted, cooled and packaged. They usually have an average moisture content of 3.5 percent, and a fat absorption value of approximately 45–50 percent.

Since the fat absorption level is high, responsibility for primary taste value is placed upon the absorbed shortening. Therefore, the fat must be bland or flavorful in character, and it must remain so during the shelf life of the chips.

A large quantity of water is liberated during the frying process. And this, in conjunction with suspended over-heated broken chips, causes rapid hydrolysis. Due to the large surface area of the chips, shortening is exposed to air in film effect and it tends to become rancid.

Potato chip stability is related to condition of the material at the time of frying as well as to the frying conditions, and the packaging containers used.

A balanced operation, in which anti-oxidants are used in conjunction with proper packaging methods, proper frying fats, and suitable containers, will assist in maintaining the quality of the potato chips.

The most generally used oil for this purpose is winterized cottonseed oil, although corn, peanut, or other vegetable oils are used. Even soya bean oil may be used, but this oil tends, under frying conditions, to produce breakdown materials which have poor flavor value.

Cottonseed, peanut or corn oils are not grown primarily for the oil in the United States. Soya bean oil is. Cottonseed, peanut, and corn oils are representative of the so-called semi-drying oil, whereas soya bean is a member of the drying family. Cottonseed, corn, and peanut oils are generally more expensive than soya bean oil.

Since the processor of potato chips has only two materials that can be utilized, one a frying medium, and the second, potatoes, it may be seen then that a high price of potatoes or a high price of vegetable oil can cause failure of the potato chip operation.

Liquid vegetable oils have iodine values ranging from 100 to 140. The iodine value is a measure of the degree of unsaturation. It is well known that the higher the iodine value, the less stable the oil is against oxidative and hydrolytic rancidity.

Soya bean, cottonseed, corn, and peanut oils are all easily oxidized and easily split up into glycerol and fat acids during frying.

When potato slices containing from 87–90% water go into the fat, which may be at a temperature of from 325–425° F., rapid hdrolysis of the frying medium occurs.

The split into glycerine and free fatty acids is as follows:

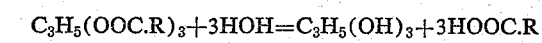

$$C_3H_5(OOC.R)_3 + 3HOH = C_3H_5(OH)_3 + 3HOOC.R$$

Glycerine further breaks down into acrolein, which is a noxious, irritating material. The fatty acids are either contained in the oil or distilled. Some acrolein and free glycerine are absorbed into the oil also.

The iodine value of frying fats falls during frying, which indicates that oxidation of the glycerine and fatty acids combination has occurred.

It is further known that heated fats, such as fats contained in potato chips, are less stabe against oxidative rancidity than fresh fats (due to the hydrogenation which has reduced the number of double bonds). Oxidative rancidity occurs when oxygen joins across the double bonds of fats.

It is apparent that the more double bonds the fat or oil has, the more oxygen it will take on, and therefore the less the shelf life. Further, the surface tension of the frying fat changes as a result of the free fatty acid development, and this results in increased and varying fat absorption rations into the potato chips.

The flavor of the potato chip is also downgraded due to the free fatty acid flavor. The shelf life of the packaged potato chip is only a matter of days when liquid oils are used, because of their susceptibility to hydrolytic and oxidative rancidity.

Oxygen attacks the unstable fat as follows:

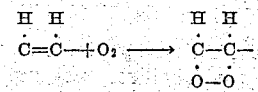

This causes rancid and bad flavor of the product. Over the east coast of the United States and as far west as Chicago, a wet potato chip is prized by the people over a dry surface chip. By a wet chip is meant one which has a tender surface and is crisp and not tough. In the past, it has been possible to produce such a chip only by frying in liquid oils.

It is well known that hydrogenation of fats and oils, whether they be of vegetable or animal origin, increases the stability of the oil against oxidative and hydrolytic rancidity. It is also well known that whereas an oil, such as soya bean has very little stability and poor flavor quality, when used as a liquid oil, that hydrogenation stabilizes this oil so that it has marked stability against hydrolytic cleavage and oxidative rancidity.

Some potato chips are fried in hydrogenated fats. These chips are more stable and remain free from rancidity for longer periods of time than chips fried in liquid oil. But potato chips fried in hydrogenated shortenings are generally tougher than those fried in liquid oils, and have dry surfaces, and they are not prized by the people in the major portions of the United States.

It is a principal object of this invention to provide a method for producing a less costly potato chip having greater stability than chips fried in the conventional manner, retaining the tender texture, oily surface, but having marked stability against hydrolytic and oxidative rancidity.

It is an object of this invention to provide a process for preparing potato chips which have marked stability against oxidative rancidity throughout their shelf life and a longer shelf life, better taste, and better texture than fried potato chips, employing conventional process operations in liquid oil.

Another object of this invention is to provide a process for preparing a potato chip which has superior quality, and at the same time, costing less to produce.

To provide a potato chip which contains both hydrogenated and unhydrogenated fats having stability greater than potato chips fried in conventional oils, is another object of this invention.

And another object of this invention is to provide a potato chip containing less total fat production and which, at the same time, has marked stability and good flavor.

Another object of this invention is to provide a process for making potato chips which have better keeping qualities.

Still another object of this invention is to provide a potato chip manufacturing process in which a more economical cooking oil may be used.

Even still another object of the invention is to provide a process for making potato chips which includes a spraying with uncooked oils.

A further object of the invention is to provide a process of potato chip manufacture in which an anti-oxygenated substance is added to the product.

And even another object of the invention is to provide an apparatus useful in potato chip production for thoroughly coating the chips in free fall with preservatives and flavoring oils and the like.

Another object of the invention is to make a new, better tasting potato chip which stays fresh for a longer time.

These and other objects and advantages of this invention will become more readily apparent and understood from the following specification and accompanying drawings in which:

Fig. 1 is a schematic illustrating the conventional manufacturing steps in the making of potato chips;

Fig. 2 is a schematic of pertinent manufacturing steps in the manufacturing process which include one form of the invention;

Fig. 3 is a schematic of pertinent steps in the manufacturing process which illustrates another embodiment of the invention;

Fig. 4 is a schematic of a typical spraying apparatus employing the free fall principle described in this invention; and Fig. 5 is a perspective view of an alternative potato chip coating apparatus using the process described in this invention.

Referring now to the drawings, and more particularly to Fig. 1 thereof, the flow of a typical potato chip manufacturing process is resolved into a number of steps which will now be explained. The whole raw potatoes, properly selected, are washed in a container 12; and are then peeled and further washed in a container 14. The potatoes are then sliced in chips by a conventional potato slicer 16, and are then soaked in water in container 18 to soak out the starch. The moisture in the sliced potatoes is then removed in a dryer 20, and the potatoes are then cooked in oil in a container 22. The surplus oil on the cooked potatoes is drained while in a conventional conveyor 24. Salt is then added to the chips by means of a salt applicator 26, and then the chips are cooled in a conveyor 28. The potato chips are then packaged by means of conventional packaging apparatus 30.

In the present invention, the steps of the process performed by components 12 to 20 remain unchanged and are not further illustrated. However, in Fig. 2 the step of cooking in container or kettle 22 can be done by using a less expensive hydrogenated oil. The cooked chips are well drained by means of the conveyor 24 and are discharged into a spray chamber 100 which later will be described in further detail. The chips here drop through a spray consisting of any one of the following or blends thereof: corn oil, peanut oil, cottonseed oil, sesame oil, and the like, and may also include an anti-oxygenated substance such as butylated hydroxy toluene or butylated hydroxy anisol. The chips become evenly coated and absorb the liquid from a minimum to two (2) percent controlling the length of the chamber, and or the disposition of the spray means and flow therefrom. Salt is applied as usual by applicator 26 and the packaging is done by the packaging apparatus 30. This new processing wets the potato chip with a palatable, preservative, uncooked oil resulting in a tasty long-lived final product.

In Fig. 3, there is illustrated an alternative procedure for applying the palatable coating by means of a vat 32 where the chips are immersed in the uncooked oils or blends thereof, drained by conveyor 24A and are then salted and packaged, respectively, by the applicator 26 and in the packaging apparatus 30.

The preferred applicator of oils in this process is illustrated in detail in Fig. 4. Numeral 112 designates the general apparatus which has a vertical chamber 118 equipped with a top feed hopper 116 and open at the bottom. Cooked potato chips 114 are delivered by the drain conveyor 24 to a hopper 114 and allowed to fall down the chamber 118. Internally of the apparatus 112 and disposed at suitable intervals, there are provided spray nozzles 122 which are attached to manifolds 120. These nozzles 122 are connected externally by means of valves 132 to a feed pipe 124. The treating liquid 128 is raised under pressure into the feed pipe 126 by a pump 126. An open chain conveyor belt 134 receives the potato chips as they fall out of the open bottom of the chamber 118 and carries them away to the salter 26, not shown in this Fig. 4. Surplus liquid caught by the walls of the chamber drops through the chain conveyor into reservoir 130 for re-circulation.

Another method of applying the flavoring and treating liquids is illustrated in Fig. 5. The usual drain conveyor 24 discharges the cooked dry chips 114 upon a loose conveyor belt 136 which is allowed to dip beneath the surface of the liquid 128 contained in a vat 138. The salted chips then pass on to the salter or applicator 26. Because the chips 114 have a tendency to float rather than properly submerge in the liquid, this is regarded as a less preferred method of accomplishing the objects of this invention.

In summary, the process of the present invention allows the potato chipper to vary the type frying method in consideration of costs of the frying material, and, in this way, gives the potato chipper finer control over cost of the product.

It is well known, as pointed out above, that the fat pick-up by the potato chip is from 10–15% less than when the chip is fried in liquid oil. This is a result of not only the low absorption of the oil into the chip, but the marked resistance of the hydrogenated fat to hydrolysis.

The stability of the chip fried in hydrogenated shortening utilizing the method or process of the present invention is marked over the normal potato chip because the hydrogenated shortening is stable. This type chip is tough and dry.

In order to produce the tender, oily chip, as pointed out above, the finished fried chip, while still hot, is passed through a bath of liquid vegetable oil. Cottonseed may be used, or any other oil.

The oil, as indicated, may be warmed or cooled, and the passage is by means of the conveyor at such a rate that there is a total of not more than two (2) percent oil pick-up in the chip. The total fat and oil combination is at least 8 to 10 percent under the chip fried in the oil itself.

It is well to employ a shortening hydrogenated selectively in such a way as to melt sharply in the mouth as are fats which are used to prepare margarine. This is not necessary, however, in order to obtain the results of this invention because any hydrogenated fat generally acceptable for frying purposes may be used.

The enclosed data point out the marked stability of the chip fried in the shortening and coated with the oil, as against the chip fried in oil alone.

A. Fat absorption

| Days | Chips Fried in Cottonseed Oil | Chips Fried in Vegetable Shortening, and Then Passed Through Bath of Cottonseed Oil | Chips Fried in Vegetable Shortening, and Then Dropped Thru Spray of Cottonseed Oil |
|---|---|---|---|
| 1 | [1] 49.0 | [1] 45.0 | [1] 45.0 |
| 2 | 50.0 | 44.0 | 44.0 |
| 3 | 48.5 | 44.5 | 45.0 |
| 4 | 50.0 | 45.0 | 45.0 |
| 5 | 50.0 | 45.0 | 45.0 |
| 6 | 49.0 | 45.0 | 45.0 |

[1] The daily tests included 100 pounds of finished chips.

B. Free fatty acid development during five days of chip frying

| Days | Chips Fried in Cottonseed Oil | Chips Fried in Vegetable Shortening, and Then Passed Through Bath of Cottonseed Oil | Chips Fried in Vegetable Shortening, and Then Dropped Thru Spray of Cottonseed Oil |
|---|---|---|---|
| 1 | 0.5 | 0.3 | 0.35 |
| 2 | 0.75 | 0.4 | 0.30 |
| 3 | 1.00 | 0.5 | 0.40 |
| 4 | 1.15 | 0.5 | 0.45 |
| 5 | 1.30 | 0.5 | 0.50 |

C. Chip stability

| Days Past Preparation | Chip No. 1—Test Temperature | | Chip No. 2—Test Temperature | | Chip No. 3—Test Temperature | |
|---|---|---|---|---|---|---|
| | 75° F. | 100° F. | 75° F. | 100° F. | 75° F. | 100° F. |
| 1 | Flavorful | Flavorful | Flavorful | Flavorful | Flavorful | Flavorful. |
| 2 | Bland | Bland | ---do--- | ---do--- | ---do--- | Do. |
| 3 | Flat | Slowly rancid | ---do--- | ---do--- | ---do--- | Do. |
| 4 | ---do--- | Rancid | ---do--- | ---do--- | ---do--- | Do. |
| 5 | Rancid | ---do--- | ---do--- | ---do--- | ---do--- | Do. |
| 6 | ---do--- | ---do--- | ---do--- | ---do--- | ---do--- | Do. |
| 7 | ---do--- | ---do--- | ---do--- | ---do--- | ---do--- | Do. |
| 8 | ---do--- | ---do--- | ---do--- | ---do--- | ---do--- | Do. |
| 9 | ---do--- | ---do--- | ---do--- | ---do--- | ---do--- | Do. |
| 10 | ---do--- | ---do--- | ---do--- | ---do--- | ---do--- | Do. |
| 11 | ---do--- | ---do--- | ---do--- | ---do--- | ---do--- | Do. |
| 12 | ---do--- | ---do--- | ---do--- | ---do--- | ---do--- | Do. |
| 13 | ---do--- | ---do--- | ---do--- | ---do--- | ---do--- | Do. |
| 14 | ---do--- | ---do--- | ---do--- | ---do--- | ---do--- | Do. |
| 15 | ---do--- | ---do--- | Flat | Flat | Flat | Flat. |

Chip No. 1 was fried in winterized cottonseed oil. Chip No. 2 was fried in hydrogenated vegetable shortening and passed through a bath containing cottonseed oil. Chip No. 3 was fried in hydrogenated vegetable shortening and then passed through a spray of cottonseed oil.

From the above, therefore, it is again emphasized that the present process of preparing a potato chip gives one which has marked stability against oxidative rancidity throughout its shelf life and a longer shelf life, better taste, and better texture than chips fried employing conventional process operations in liquid oil. At the same time, a potato chip is obtained which has superior quality, and which is more economical to produce. The potato chip contains both hydrogenated and unhydrogenated fats and it has greater stability than potato chips fried in conventional oils. Finally, the potato chip produced contains less total fat productions, and at the same time, has marked stability and good flavor.

Obviously many modifications and variations of the present invention are possible in light of the above teachings. It is, therefore, to be understood that within the scope of the appended claims the invention may be practiced otherwise than as specifically described.

What is claimed is:

1. A process for preparing potato chips having improved taste and texture and longer shelf life comprising cooking sliced chips in hydrogenated oil and evenly coating the cooked chips with a liquid oil and maintaining said liquid oil in the uncooked state, said liquid oil being used in an amount such that the chips absorb the oil in an amount not exceeding about 2%.

2. A process as recited in claim 1 wherein the liquid oil is selected from the group consisting of corn, peanut, cottonseed, sesame oils and mixtures thereof.

3. A process as recited in claim 2 wherein the liquid oil is applied to the chips by spraying.

4. A process as recited in claim 1 wherein the liquid oil contains an anti-oxidant.

(References on following page)

References Cited in the file of this patent

UNITED STATES PATENTS

| | | |
|---|---|---|
| 2,207,316 | Ferry | July 9, 1940 |
| 2,286,644 | Pringle et al. | June 16, 1942 |
| 2,611,705 | Hendel | Sept. 23, 1952 |
| 2,678,599 | Maddocks | May 18, 1954 |
| 2,685,249 | Badger | Aug. 3, 1954 |

OTHER REFERENCES

"Food Technology," February 1951, pp. 69, 72.

"Meat Fats for Frying Potato Chip" by Reimenschneider, Reprint from June 1952 issue "Potato Chipper," 2 pages.